Figure 1:
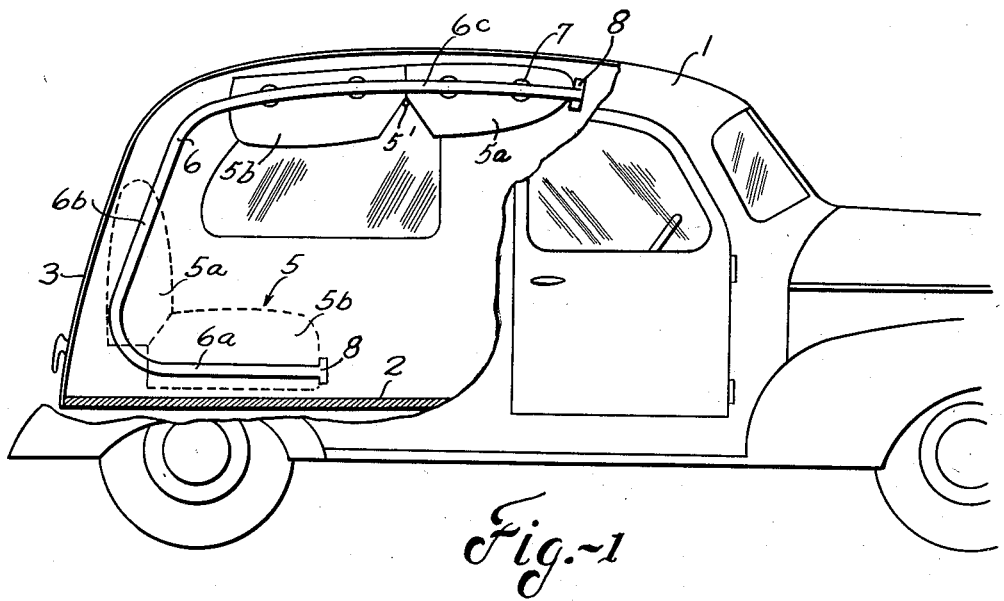

Jan. 15, 1952     L. E. FISHER     2,582,687

CONVERTIBLE VEHICLE

Filed Sept. 18, 1947

Leonard E. Fisher, Inventor

By Tom Walker, Attorney

Patented Jan. 15, 1952

2,582,687

UNITED STATES PATENT OFFICE 2,582,687

CONVERTIBLE VEHICLE

Leonard E. Fisher, Dayton, Ohio

Application September 18, 1947, Serial No. 774,747

4 Claims. (Cl. 296—65)

This invention pertains to convertible motor vehicles, and more particularly to a utility vehicle usable optionally as a passenger car and as a truck for conveyance of merchandise, baggage, or equipment, and especially to a shifting seat construction making available an auxiliary storage compartment of relatively large capacity.

In the present instance a rear seat of conventional form and appearance is slidingly mounted on curvilinear track guides or slots in the opposite side walls of the vehicle body, enabling the shiftable rear seat to be adjusted from its normal upright passenger carrying position, rearwardly and thence upwardly and forwardly in parallel position with the top or roof of the vehicle body where it is suspended in inverted position while the rear of the vehicle body is utilized for storage purposes. To facilitate the transposition of the seat from one position to the other, the back and cushion sections of the seat are flexibly interconnected to better enable the seat to follow its curvilinear path and assume a substantially planar form when in its elevated suspended position to reduce the space so occupied, and minimize the interference of the elevated seat with storage within the vacated vehicle body space.

The object of the invention is to improve the construction as well as the means and mode of operation of convertible motor vehicle bodies, whereby they not only be economically constructed, but will be efficient in use, convenient, of increased capacity, easily transformed from passenger to trucking uses, possessing a minimum number of operating parts, and unlikely to get out of repair.

A further object of the invention is to provide a flexible seat structure automatically adaptable to its varying to and fro course, and which when in its normal position will retain the appearance and comfort of a conventional motor vehicle seat, and which when shifted to its non-use position will occupy minimum space, without disconnection or dismemberment of the seat parts and enable retention of its sliding engagement with the vehicle body.

A further object of the invention is to provide a convertible vehicle body possessing the advantageous structural features, the inherent meritorious characteristics, and the mode of operation herein set forth, or their equivalents.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

In the accompanying drawings, wherein is illustrated a preferred but obviously not necessarily the only form of embodiment of the invention, Fig. 1 is a longitudinal sectional view of a vehicle body embodying the present invention, wherein the rear passenger seat is shown by dotted lines in its normal usable position, while the same seat is shown by solid lines in its elevated inverted non-usable position.

Figure 2:
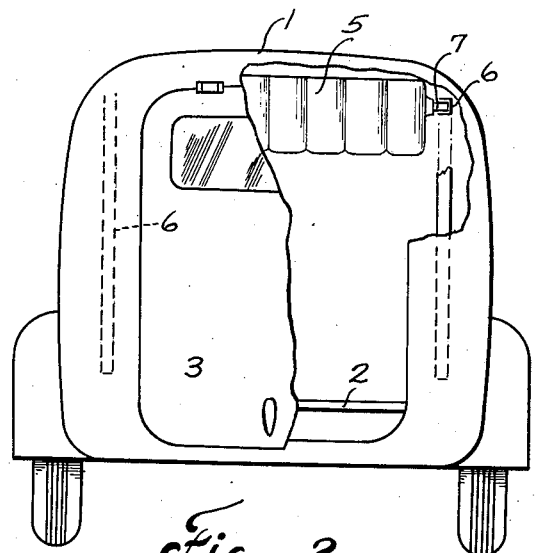

Fig. 2 is a transverse sectional view of the vehicle body showing a rear view of the passenger seat retracted to the same position shown by solid lines in Fig. 1.

Like parts are indicated by similar characters throughout the several views.

While the present invention may be incorporated in vehicle bodies of different design, including the conventional sedan type of passenger vehicle body, it is more especially applicable to a vehicle body of the type and style generally known as a station wagon, having a rear loading and access door.

In the drawing is shown a vehicle body of such general type, of which 1 is the top or roof, having a floor or bottom 2 and a rear door 3. At the front is a conventional seat for the driver and an accompanying passenger. To the rear is a second seat 5 for passengers.

Such seats are usually adjustable horizontally to and fro through a limited range. Furthermore, the rear seat 5 is ordinarily disconnectable and entirely removable from the vehicle body. However, it is frequently desirable to convey a load of equipment or merchandise in one direction and equally desirable to carry passengers on the return trip. Since all available storage space is utilized on the equipment or merchandise trip, there is no room to conveniently carry the seat 5 for use of return passengers. The primary purpose of the instant invention will be afforded for storage, but the seat retained conveniently available upon discharge of the load.

To this end, the back 5a and cushion section 5b of the seat 5 are flexibly coupled, as by a hinge 5' to enable them to follow a curved path in adjustment from the normal passenger carrying position to the retracted elevated position suspended from the top of the vehicle body. The opposite side walls of the vehicle body are provided with curved guide tracks 6. These tracks 6 may comprise contoured grooves in the body side walls or they may consist of projecting track flanges or rails with which the seat sections 5a and 5b are slidingly engaged. This may be effected, for example, by laterally projecting studs 7 located at intervals upon the side margins of the back and cushion sections of the seat 5 which extend into the guide slot 6 or between parallel guide flanges.

The guide track, of whatever type, includes a horizontal lower portion 6a joined to an upwardly continuing track portion 6b joined to the lower portion by an arcuate juncture of relatively long radius. At its top the upwardly continuing portion 6b is likewise joined to an upper horizontal portion 6c by a similar arcuate juncture of similar long radius. The seat sections 5a and 5b being slidingly engaged with the curvilinear track may be slidingly moved therealong from the lower horizontal portion 6a through the upright portion 6b into sliding engagement with the upper portion 6c.

The seat sections 5a and 5b being flexibly interconnected, the sections will readily accommodate themselves to the variations of the guide track by oscillating to and fro, one relative to the other, as they pass the arcuate juncture portions of the guide track. In making the traverse from the lower to the upper portions of the guide track, the seat sections are reversed, and upon entering the upper horizontal portion 6c of the guide track, due to their flexible interconnection the seat sections are aligned in a common plane parallel with and closely adjacent to the top 1 of the vehicle body. Stops or bumpers 8 are provided at the extremities of upper and lower portions of the guide track against which the seat 5 may abut.

Preferably, but not necessarily, latch or detent means may be provided for securing the seat in its respective positions of adjustment.

In its elevated inverted suspended position closely adjacent to the top or roof 1 of the vehicle body, the seat does not interfere with the loading of the vehicle body. When so retracted, the seat leaves full length and width of the body vacant for storage, to but little less than the full height of the body space occupied by the inverted suspended seat. Upon unloading the vehicle body, the retracted seat is in position to be immediately, easily and quickly slidingly adjusted in reverse direction along the guide track to its normal position for passenger use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A vehicle body wherein a passenger seat is retractible to afford increased storage space, including a guide track upon the interior opposite side walls of the vehicle body comprising a horizontal lower portion, a horizontal upper portion and upright intermediate connecting portion merging into the horizontal lower and upper portion upon easy curves; a shiftable seat comprising flexibly intercoupled back and cushion sections having sliding engagement with the guide tracks capable of traversing the path from the lower to the upper horizontal portions of the guide tracks and vice versa, the construction and arrangement being such that when shifted to the upper horizontal portions of the guide track the seat sections will assume an extended position with the back and cushion sections thereof in inverted position in a common plane in approximate parallel relation with the roof of the body, leaving the length and width of the vehicle body therebeneath unobstructed.

2. A retractible seat for a vehicle body to afford increased storage space therein, a flexible seat, contiguous portions of which are relatively adjustable into a common plane, guide tracks of substantially recumbent U-shape carried by the opposite side walls of the vehicle body, spaced projections carried by the flexible seat unit having engagement with the guide tracks, progressively throughout the recumbent U-shapes thereof whereby the flexible seat is transferred from engagement with one of the substantially parallel arms of the recumbent U-shaped guide track to engagement with the other parallel arm thereof, the seat being movable from one to the other arm of the guide tracks while maintaining the engagement of the seat therewith incident to and fro flexing movement of the seat, the flexible seat when engaged with one pair of corresponding parallel arms of the guide tracks being usable as a passenger seat within the vehicle body, and when engaged with the pair of corresponding opposite parallel arms of the guide tracks being so displaced within the vehicle body as to leave the length and width of that portion of the vehicle body normally occupied by the seat substantially unobstructed to receive storage material therein.

3. A vehicle body wherein a passenger seat is shiftable from usable to non-usable position, including a pair of substantially U-shaped guide members secured to opposite sides of the body, the parallel arms of which are disposed in parallel relation with the top and bottom of the body, a multi-section flexible seat adjustably engageable with the guides, said seat in normal positon being flexed with one section thereof resting upon the lower arms of said guides and the other section supported in substantially vertical position by engagement with the vertical portion of the guides, the construction and arrangement being such that the multi-section seat may be moved from its normal position to an inverted overhead position, the sections thereof being suspended from the upper arms of the guide in aligned relation.

4. A dual purpose vehicle body, a flexibly united multi-section passenger seat therein, curvilinear supports therefor fixedly secured adjacent opposite sides of the body relative to which supports the multi-section seat is slidingly adjustable, said curvilinear supports including a lower portion adjacent the bottom of the vehicle body and an overlying upper portion adjacent the top of the vehicle body upon which the seat sections may be suspended in inverted, aligned position in closely adjacent parallel relation with the top of the body, thereby providing additional storage space for merchandise.

LEONARD E. FISHER.

REFERENCES CITED

The following references are of record in the file of this patent:

UNITED STATES PATENTS

| Number | Name | Date |
|---|---|---|
| 1,715,075 | Puscas | May 28, 1929 |
| 1,729,825 | Gaiser | Oct. 1, 1929 |
| 2,257,103 | Brokering | Sept. 30, 1941 |
| 2,379,385 | Styers | June 26, 1945 |